UNITED STATES PATENT OFFICE 2,398,598

1,3-DICHLORO-5-METHYL-5-ISOBUTYL HYDANTOIN AND METHOD OF PREPARATION

Arthur O. Rogers, Lewiston, N. Y., assignor to E. I. du Pont de Nemours & Company, Wilmington, Del., a corporation of Delaware No Drawing. Application October 14, 1942, Serial No. 462,001

2 Claims. (Cl. 260—309.5)

This invention relates to a new chlorine-containing compound, and to a method by which that compound may be prepared from readily available starting materials. More particularly, it relates to 1,3-dichloro-5-methyl-5-isobutyl hydantoin, a solid product containing available chlorine, and to a method of preparing this compound from 5-methyl-5-isobutyl hydantoin. The latter compound may be prepared by reacting methylisobutyl ketone with sodium cyanide and ammonium carbonate, or by other known methods.

1,3 - dichloro - 5 - methyl-5-isobutyl hydantoin may be readily prepared by reacting chlorine with 5-methyl-5-isobutyl hydantoin in an aqueous reaction mixture which is alkaline in reaction. The resulting product is a solid containing approximately 29.3% of active chlorine. It can be utilized in place of the hypochlorites or other chlorine-yielding chemicals, and is generally less water sensitive than those products. It is less reactive in moist air, and is characterized by a low vapor pressure and a high molecular weight.

While various chlorinated hydantoins are known, such as 1,3-dichloro hydantoin, and 1,3-dichloro-5,5-dimethyl hydantoin, the new chemical compound, 1,3-dichloro-5-methyl-5-isobutyl hydantoin, is characterized by unusual solubility characteristics. Surprisingly enough, it is soluble in a number of solvents which will not dissolve 1,3-dichloro-5,5-dimethyl hydantoin to an appreciable extent. It is also much more soluble than the analogous 1,3-dichloro-5,5-dimethyl hydantoin in a number of solvents which will also dissolve the 1,3-dichloro-5,5-dimethyl compound. The improved solubility characteristics of this product render it much more valuable than other known chlorinated hydantoins when utilized as an active chlorine-yielding agent. In manufacturing my improved chlorine-yielding compound it is first desirable to prepare 5-methyl-5-isobutyl hydantoin from available starting materials. This may be readily accomplished by dissolving methyl isobutyl ketone in 95% ethanol, and then adding to the solution ammonium carbonate which has previously been dissolved in water. An aqueous solution of sodium cyanide may then be run into the reaction mixture and a temperature of 60 to 65° C. maintained, with agitation, for several hours. Upon cooling to room temperature and neutralizing with a mineral acid such as hydrochloric acid, the 5-methyl-5-isobutyl hydantoin is precipitated, and can be recovered by filtration.

In preparing the 1,3-dichloro-5-methyl-5-isobutyl hydantoin desired, the 5-methyl-5-isobutyl hydantoin is dissolved in an aqueous alkaline solution. The solution may be rendered alkaline by the use of any basic material which does not have an adverse effect in breaking the ring structure of the starting material. Sodium carbonate has been used with resulting high yields, but other basic materials such as lime, sodium hydroxide, sodium bicarbonate etc. may also be employed.

Gaseous chlorine may now be passed into the aqueous alkaline solution containing the dissolved hydantoin. The reaction mixture may be subjected to agitation and the introduction of chlorine should be continued until the solution is approximately neutral in reaction. The reaction temperature may be maintained at 30 to 40° C. At that time the product may be filtered off, washed free of chloride ion, and dried.

The starting material, 5-methyl-5-isobutyl hydantoin has the following chemical formula:

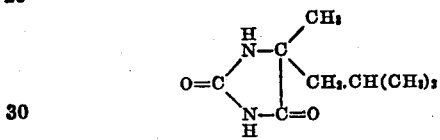

The chlorine-containing product 1,3-dichloro-5-methyl-5-isobutyl hydantoin has the following chemical formula:

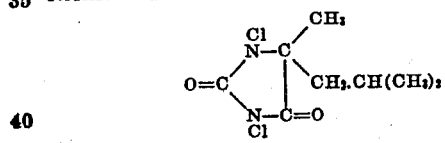

It is a white powder which is very much more soluble in various organic solvents than the corresponding 1,3-dichloro-5,5-dimethyl hydantoin. Surprisingly enough, it is much less soluble in water and aqueous liquids than 1,3-dichloro-5,5-dimethyl hydantoin. In the following table the solubilities of these two chlorine-yielding compounds in grams per 100 grams of solvent utilizing various solvents are contrasted.

| Solvent (100 grams) | 1,3-dichloro-5,5-dimethyl hydantoin | | 1,3-dichloro-5-methyl-5-isobutyl hydantoin | |
|---|---|---|---|---|
| | Solubility in grams per 100 grams of solvent | Temperature in degrees C. | Solubility in grams per 100 grams of solvent | Temperature in degrees C. |
| Tetrachlorethane | 18.0 | 26 | 120.0 | 30 |
| Carbon tetrachloride | 1.25 | 25 | 31.0 | 32 |
| Chloroform | 18.3 | 38 | 100.0 | 32 |
| Trichlorethylene | 4.53 | 25 | 167.0 | 30 |
| Methylene chloride | 45.0 | 34 | 111.0 | 28 |
| Ethylene dichloride | 31.8 | 28 | 100.0 | 32 |
| Perchlorethylene | 1.0 | 23 | 11.0 | 25 |
| Monochlorobenzene | 7.1 | 25 | 71.5 | 29 |
| Dimethyl formamide | 41.3 | 25 | 143.0 | 32 |
| Nitromethane | 24.5 | 25 | 80.0 | 28 |
| 1,4-dioxane | 17.0 | 25 | 100.0 | 31 |
| Naphtha (b. p. 140° F.) | 0.5 | 25 | 6.5 | 34 |
| Water | 0.21 | 25 | 0.026 | 30 |

Example 5 moles of methyl isobutyl ketone was dissolved in 2.5 liters of 95% ethanol and the solution mixed with an aqueous solution of 12.5 moles of ammonium carbonate dissolved in 2.5 liters of water. A solution of 5 moles of sodium cyanide in 750 cc. of water was then allowed to run into the solution of the ketone, a period of ½ hour being required for complete admixture. The mixture was held at a temperature of 60 to 65° C. and agitated for 3 hours. It was then cooled to 20° C., and neutralized with 2 liters of concentrated hydrochloric acid. 770 grams of pure 5-methyl-5-isobutyl hydantoin was precipitated and recovered by filtration. An additional 20 grams of slightly impure product was recovered by evaporating the filtrate to ⅔ of its original volume. The total yield of 5-methyl-5-isobutyl hydantoin was approximately 93% of the theoretical.

The hydantoin was then chlorinated with chlorine in a sodium carbonate solution. 8.94 moles of the 5-methyl-5-isobutyl hydantoin, 13.41 moles of soda ash, and 20 liters of water were placed in a 10 gallon earthenware vessel equipped with a rapid mechanical stirrer. Chlorine gas was passed into the reaction mixture at a temperature of 30 to 40° C. until the solution was approximately neutral in reaction. The product was filtered off, washed until it was free from chloride ion, and dried at 60° C. The yield was approximately 96.8% of the theoretical, and the resulting 1,3-dichloro-5-methyl-5-isobutyl hydantoin contained about 29.3% of active chlorine.

The new compound dissolves in water yielding a solution containing approximately 15 parts per million of available chlorine. This solution is useful as an antiseptic and germicidal agent, and for various bleaching and decolorizing purposes. Solutions thereof in inert solvents may be utilized for impregnating cloth or other fibrous material, or for other purposes.

It should be understood that various changes may be made in the preferred procedure as given herein as illustrative without departing from the spirit of my invention.

I claim:
1. 1,3-dichloro-5-methyl-5-isobutyl hydantoin.
2. The method of preparing 1,3-dichloro-5-methyl-5-isobutyl hydantoin which comprises reacting chlorine with 5-methyl-5-isobutyl hydantoin in a dilute aqueous alkaline medium.

ARTHUR O. ROGERS.